United States Patent
de Ruijter et al.

(10) Patent No.: US 8,908,750 B2
(45) Date of Patent: Dec. 9, 2014

(54) CIRCUIT DEVICE INCLUDING PEAK AND AVERAGE DETECTORS

(75) Inventors: Hendricus de Ruijter, Sunnyvale, CA (US); Ping Xiong, Sunnyvale, CA (US)

(73) Assignee: Silicon Laboratories Inc., Austin, TX (US)

( * ) Notice: Subject to any disclaimer, the term of this patent is extended or adjusted under 35 U.S.C. 154(b) by 1007 days.

(21) Appl. No.: 12/414,729

(22) Filed: Mar. 31, 2009

(65) Prior Publication Data

US 2010/0246649 A1    Sep. 30, 2010

(51) Int. Cl.
*H04B 3/46* (2006.01)
*H04L 27/06* (2006.01)
*H04L 27/08* (2006.01)

(52) U.S. Cl.
CPC *H04L 27/06* (2013.01); *H04B 3/46* (2013.01); *H04L 27/08* (2013.01)
USPC .......................................... 375/224; 375/340

(58) Field of Classification Search
USPC ......... 375/224, 225, 312, 316, 318, 343, 345, 375/297, 317, 259; 455/126, 91, 260, 339, 455/410, 247, 115, 116, 127.1; 330/127, 330/207 P, 207
See application file for complete search history.

(56) References Cited

U.S. PATENT DOCUMENTS

| | | | |
|---|---|---|---|
| 4,165,493 A * | 8/1979 | Harrington ................ | 330/207 P |
| 4,370,622 A * | 1/1983 | Hornbeck et al. ......... | 330/207 P |
| 4,716,563 A | 12/1987 | Roust ........................ | 370/110.4 |
| 4,740,996 A | 4/1988 | Somer ............................ | 375/76 |
| 5,835,530 A * | 11/1998 | Hawkes ........................ | 375/225 |
| 6,166,598 A * | 12/2000 | Schlueter ...................... | 330/127 |
| 6,563,816 B1 * | 5/2003 | Nodoushani et al. ......... | 370/352 |
| 6,744,309 B1 | 6/2004 | Petrov et al. .................. | 329/347 |
| 6,795,490 B2 | 9/2004 | Belotserkovsky ............. | 375/150 |
| 7,082,293 B1 * | 7/2006 | Rofougaran et al. ......... | 455/260 |
| 7,088,794 B2 | 8/2006 | Nichols ......................... | 375/345 |
| 7,697,903 B2 * | 4/2010 | Behzad ........................... | 455/91 |
| 7,738,594 B2 * | 6/2010 | Zipper et al. .................. | 375/297 |
| 7,741,903 B2 * | 6/2010 | Vinayak et al. ............... | 330/127 |
| 7,962,117 B2 * | 6/2011 | Elder et al. .................... | 455/333 |
| 2001/0001616 A1 * | 5/2001 | Rakib et al. .................... | 375/259 |
| 2002/0191252 A1 | 12/2002 | Pugel ............................. | 359/142 |
| 2005/0063297 A1 | 3/2005 | Sakata et al. .................. | 370/208 |
| 2005/0201450 A1 * | 9/2005 | Volpi et al. .................... | 375/150 |
| 2008/0139145 A1 * | 6/2008 | Behzad ........................ | 455/127.1 |
| 2009/0074117 A1 * | 3/2009 | Fujita et al. ................... | 375/343 |
| 2010/0220817 A1 * | 9/2010 | Zocher et al. ................. | 375/317 |

OTHER PUBLICATIONS

Infineon Technologies, Wireless Components: ASK/FSK Single Conversion Receiver TDA 5210 Version 3.0, Specification, May 2001.
RF Monolithics, Inc., RFM TRC103 Product Overview, 863-960 MHz RF Transceiver, Jan. 20, 2009.
Melexis Microelectronic Integrated Systems, MLX71121 300 to 930 MHz FSK/FM/ASK Receiver, Revision 008, Jun. 2008.

* cited by examiner

*Primary Examiner* — Daniel Washburn
*Assistant Examiner* — Fitwi Hailegiorgis
(74) *Attorney, Agent, or Firm* — Cesari & Reed LLP; R. Michael Reed

(57) ABSTRACT

In a particular embodiment, a circuit device includes a peak detector to receive a signal and to generate peak output data related to the received signal and an average detector to generate average output data related to the received signal. The circuit device further includes a logic circuit to generate a data output related to the received signal based on the generated peak output data and the generated average output data.

18 Claims, 5 Drawing Sheets

US 8,908,750 B2

CIRCUIT DEVICE INCLUDING PEAK AND AVERAGE DETECTORS

FIELD

The present disclosure is generally related to a detector circuit including a peak detector and an average detector.

BACKGROUND

Electrical signals can be modulated to convey information. However, for any given transmission medium, the electrical signal can decay or attenuate, causing data to be lost. To reduce data loss, communication systems can modulate the data (the baseband signal) or superimpose the data onto a carrier wave in the radio frequency (RF) spectrum. Receiver circuitry demodulates the baseband signal from the modulated signal, and the demodulated data represented by the baseband signal may be processed by associated circuitry. To extract the data from the baseband signal, circuitry can be used to determine the baseband signal's amplitude at particular sampling times. Such amplitude detection can be used to decode Amplitude Shift Keying (ASK) encoded signals, On-Off Keying (OOK) encoded signals, other encoded signals, or any combination thereof. As used herein, ASK encoding relates to a modulation technique where information is represented by changes in amplitude of an associated carrier wave. Further, as used herein, the OOK encoding refers to a modulation technique where information is represented by the presence or absence of a carrier wave.

Such modulation techniques are often used with radio frequency systems for utilities (such as utility-usage meter reading), for household items (such as home automation systems, garage door openers, and the like), for automotive features (such as tire pressure monitors, remote keyless entry systems, and the like), for other low-power applications, or any combination thereof. Accordingly, electronic devices that utilize such receivers may be used in environments that have more than one transmitter operating at the same or adjacent frequencies, which can lead to information degradation due to cross-talk and other interference. Unfortunately, conventional decoders often have low sensitivity or poor pulse-related co-channel interference immunity.

SUMMARY

In a particular embodiment, a circuit device includes a peak detector to receive a signal and to generate peak output data related to the received signal and includes an average detector to generate average output data related to the received signal. The circuit device further includes a logic circuit to generate a data output related to the received signal based on the generated peak output data and the generated average output data.

In another particular embodiment, a circuit device is disclosed that includes an input to receive a source signal, an average detector coupled to the input and adapted to generate average data related to the source signal, and a peak detector coupled to the input and adapted to generate peak data related to the source signal. The circuit device further includes a logic circuit to receive the average data and the peak data and to generate output data in response to receiving the average data and the peak data.

In still another particular embodiment, a receiver circuit is disclosed that includes an average detector to receive a source signal and to generate an average output related to the source signal and includes an average slicer coupled to the average detector to sample the average output to generate average output data. The receiver circuit further includes a peak detector in parallel with the average detector. The peak detector is adapted to receive the source signal and to generate a peak output related to the source signal. The receiver circuit also includes a peak slicer coupled to the peak detector to sample the peak output to generate peak output data. Further, the receiver circuit includes a logic circuit to receive the average output data and the peak output data and to generate a decoded data output related to the source signal in response to receiving the average and peak output data.

DETAILED DESCRIPTION OF ILLUSTRATIVE EMBODIMENTS

In a particular embodiment, a channel detector is adapted to receive encoded signals, which may be affected by co-channel interference, low signal strength, or any combination thereof. In certain markets, such as radio frequency meter reading, home automation systems, garage door openers, tire pressure monitors, remote keyless entry systems, and other systems, radio frequency receivers have to detect data from signals that can be affected by co-channel interference (cross-talk between transmitters using the same or adjacent frequencies) and that may have low signal strength. In a particular example, the channel detector includes an average detector and a peak detector in parallel and logic circuitry coupled to the channel and peak detectors to generate a data output related to average and peak data from the detectors.

Figure 1:
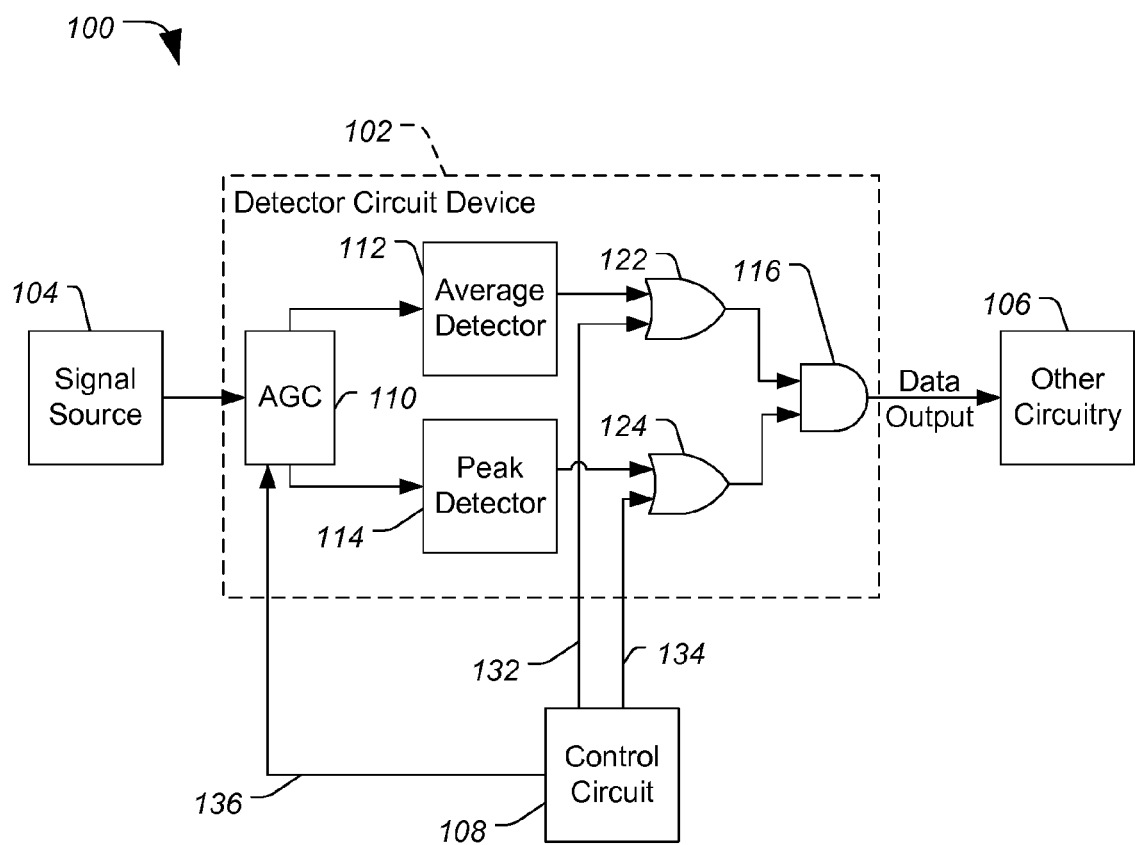
FIG. 1 is a block diagram of a particular illustrative embodiment of a system including a circuit device having an average detector and a peak detector in parallel.

FIG. 1 is a block diagram of a particular illustrative embodiment of a system 100 including a detector circuit device 102 having an average detector 112 and a peak detector 114 in parallel. The detector circuit device 102 is coupled to a signal source 104 to receive an encoded signal, such as an amplitude shift-keying (ASK) encoded signal, an on-off keying (OOK) encoded signal, another signal, or any combination thereof. Further, the signal source 104 can be an antenna, an amplifier, a communications channel, another signal source, or any combination thereof. The detector circuit device 102 is also coupled to other circuitry 106, such as a microprocessor, other circuits, or any combination thereof. The detector circuit device 102 may also be coupled to a control circuit 108, such as a processor, control logic, another circuit, or any combination thereof.

The detector circuit device 102 includes an adjustable gain control circuit 110 that is coupled to the signal source 104 to receive the source signal. The adjustable gain control circuit 110 is adapted to apply a gain to the source signal to produce an adjusted source signal. In a particular embodiment, the gain applied by the adjustable gain control circuit 110 can be configured via control signals received via line 136 from the control circuit 108. The detector circuit device 102 further includes the average detector 112 and the peak detector 114 coupled to the adjustable gain control circuit 110 in parallel to detect average source signal information and peak source signal information, respectively, from the adjusted source signal. The detector circuit device 102 also includes a first logical OR gate 122 including a data input coupled to the average detector 112 and includes a control input coupled to the control circuit 108 via line 132. The detector circuit 102 further includes a second logical OR gate 124 including a first input coupled to the peak detector 114 and a control input coupled to the control circuit 108 via line 134.

The detector circuit device 102 also includes a logical AND gate 116 that includes a first input coupled to an output of the first logical OR gate 122 and includes a second input coupled to the output of the second logical OR gate 124. The logical AND gate 116 also includes a data output to provide decoded output data related to the source signal to the other circuitry 106.

In a particular embodiment, the detector circuit device 102 is adapted to decode the source signal. By utilizing both the average detector 112 and the peak detector 114 in parallel to decode the source signal, the detector circuit device 102 demonstrates robustness against co-channel interference while maintaining a high sensitivity. As used herein, the term "co-channel interference" refers to cross-talk or interference from different transmitters using the same or adjacent transmission frequencies. In a particular example, the average detector 112 provides a relatively high sensitivity to amplitude variations, and the peak detector 114 provides good immunity against pulsed co-channel interference (illustrated in FIG. 3). Further, the peak detector 114 provides immunity against continuous wave interference.

Figure 2:
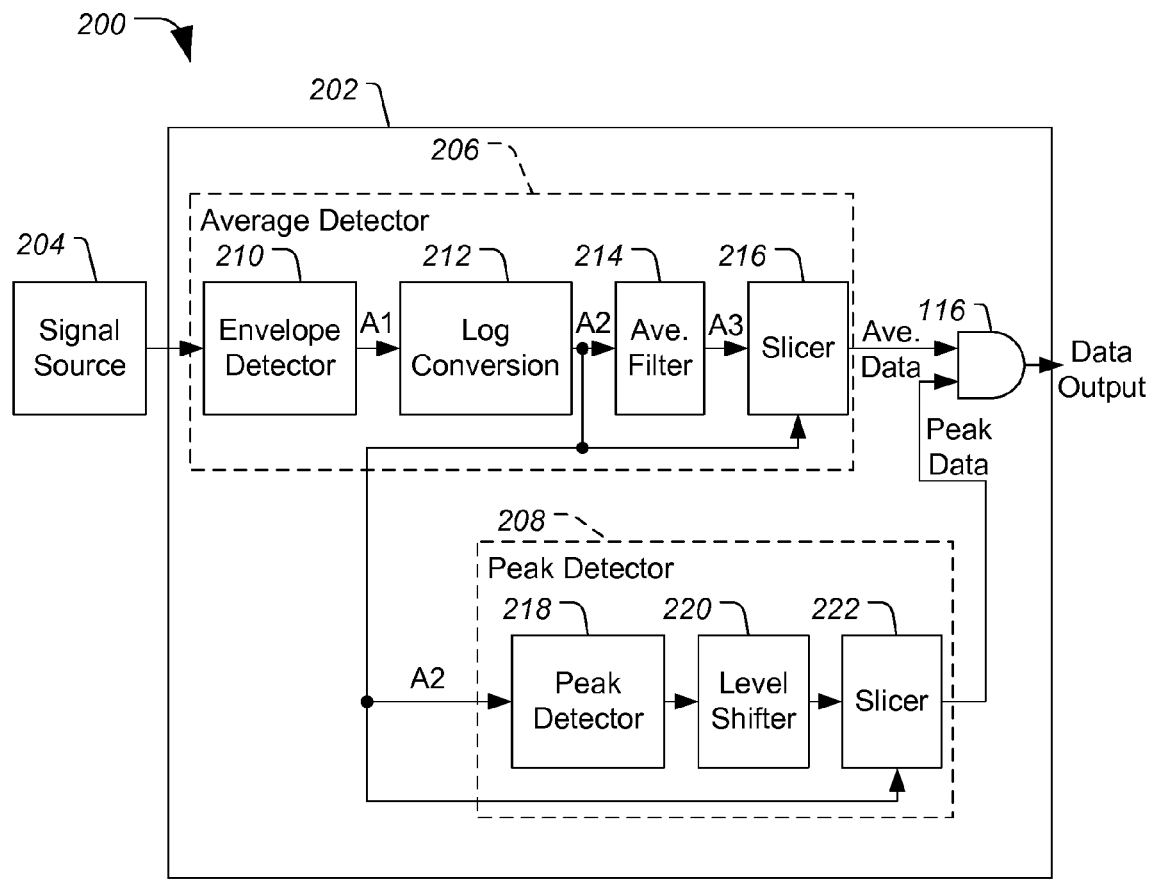
FIG. 2 is a block diagram of a second particular illustrative embodiment of a system including a circuit device having an average detector and a peak detector in parallel.

FIG. 2 is a block diagram of a second particular illustrative embodiment of a system 200 including a circuit device 202 having an average detector 206 and a peak detector 208. The circuit device 202 is coupled to a signal source 204 to receive a source signal. In a particular embodiment, the signal source 204 can be an antenna, an amplifier, another circuit, or any combination thereof. The source signal can be an encoded signal, such as an amplitude shift keying (ASK) encoded signal, an on-off keying (OOK) encoded signal, another type of encoded signal, or any combination thereof.

The circuit device 202 includes the average detector 206 and the peak detector 208 and includes logic circuitry 116. In a particular embodiment, the logic circuitry 116 can be a logical AND gate that is adapted to combine average data and peak data to produce a data output. The average detector 206 includes an envelope detector 210 to receive a high frequency input signal and to produce an envelope output signal related to a peak amplitude of the high frequency input signal. In a particular example, a radio frequency signal can be written in the following form:

$$x(t)=R(t)\cos(wt+(t))$$ (Equation 1)

In amplitude modulated (AM) signals, the phase component ((t)) of the signal (x(t)) is constant and can be ignored so that the information of the signal is in the component (R(t)), which can be referred to as the envelope of the signal. In this example, the AM signal can be represented by the following equation:

$$x(t)=(C+m(t))\cos(wt)$$ (Equation 2)

where R(t)=C+m(t), and where m(t) represents the original information and the variable (c) represents a carrier amplitude. In this example, extraction of the envelope allows the original message to be recovered.

The envelope detector 210 is adapted to receive a source signal (such as x(t) in Equation 1) and to generate an envelope signal (A1), which is provided to a log conversion module 212. In a particular embodiment, the log conversion module 212 is adapted to convert an input signal (such as the envelope signal (A1)) to a logarithmic output signal (A2). The logarithmic output signal (A2) is provided to an averaging filter 214, which produces an average output signal (A3). The averaging slicer 216 samples the average output signal (A3) to generate average data that is provided to a first input of the logic circuitry 116. In a particular embodiment, the averaging slicer 216 compares the signal before and after averaging to extract modulated data at its output.

The logarithmic output signal (A2) is also provided as an input to the peak detector 208, which includes a peak detector circuit module 218 to receive the logarithmic output voltage (A2) and to generate peak output information. The peak output information is provided to a level shifter circuit 220, which is adapted to apply an offset to the peak output information to produce adjusted peak output information. In a particular example, the offset can be approximately −6 dB. A peak slicer 222 is adapted to slice the adjusted peak output information to generate peak data, which is provided to the logic circuitry 116.

The logic circuitry 116 combines the average data and the peak data to generate output data related to the source signal. In a particular embodiment, the logic circuitry 116 applies a logical AND operation to the average and peak data to generate the output data.

Figure 3:
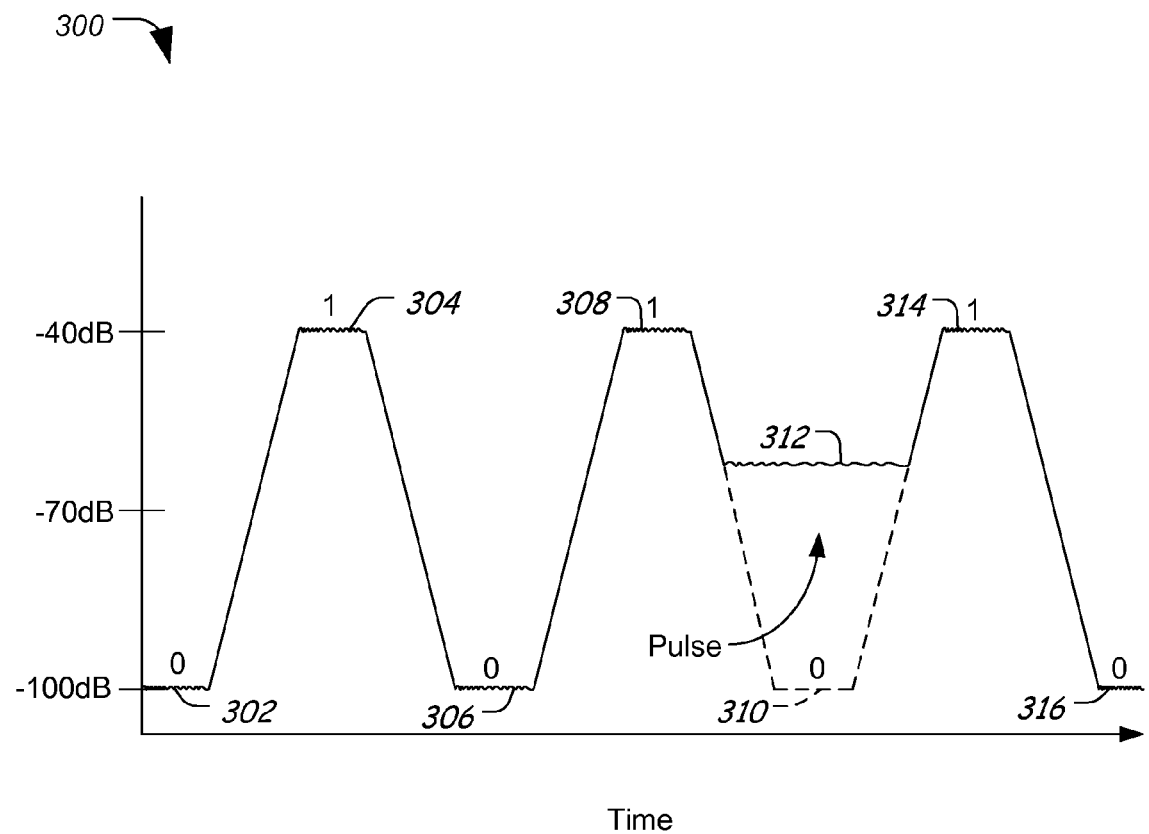
FIG. 3 is a diagram of a particular illustrative embodiment of decibels versus time for an on-off keying signal including co-channel interference.

FIG. 3 is a diagram 300 of decibels versus time for an on-off keying signal including co-channel interference. In this particular example, the diagram 300 illustrates an encoded source signal representing zeros at 302, 306, and 316 (below 70 dB) and representing ones at 304, 308 and 314 (above 70 dB). At 312, co-channel interference, such as a pulse at the same frequency or at an adjacent frequency may cause the receiver to generate a bit error. For example, the co-channel pulse can prevent the source signal from falling below 70 dB (as shown by the dotted line at 310), causing the channel detector to detect a one value instead of a zero value.

At strong input levels, the average detector by itself demonstrates poor co-channel pulse immunity. However, the peak detector used in conjunction with the average detector provides much better co-channel pulse immunity as well as good continuous wave co-channel immunity. In a particular embodiment, the peak detector can have an adjustable peak detection threshold, which can be adjusted to a level above 70 dB, for example, to enhance peak detection sensitivity.

Figure 4:
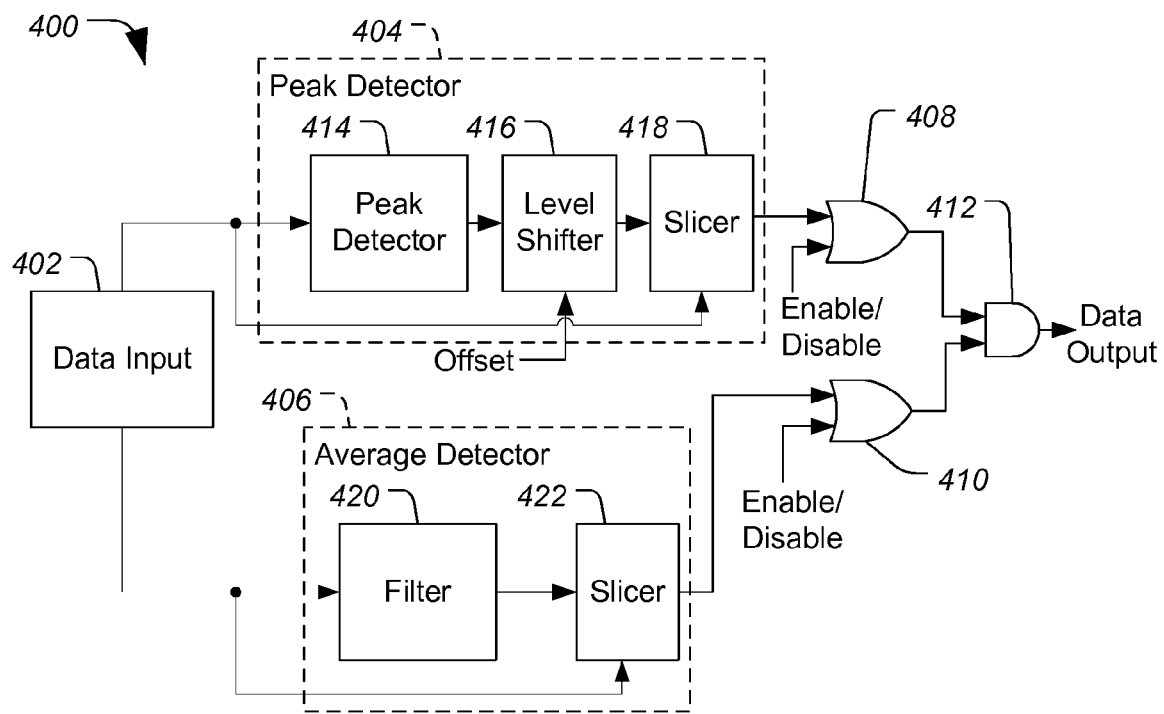
FIG. 4 is a block diagram of a third particular illustrative embodiment of a system including a circuit device having an average detector and a peak detector in parallel.

FIG. 4 is a block diagram of a third particular illustrative embodiment of a system 400 including a circuit device having an average detector circuit 406 and a peak detector circuit 404 in parallel. The system 400 includes a data input 402 to provide a source signal to the average detector circuit 406 and to the peak detector circuit 404. In this particular example, the data input 402 can be a log conversion module, an antenna, an amplifier, another circuit, or any combination thereof. The system 400 further includes logic circuitry including a first logical OR gate 408, a second logical OR gate 410, and a logical AND gate 412.

The peak detector circuit 404 includes a peak detector 414 to receive the source signal and to generate peak output information related to the source signal. The peak detector circuit 404 further includes a level shifter circuit 416 that is configurable via an offset control signal to adjust the generated peak output information to produce adjusted peak output information. In a particular example, the offset control signal can represent a −6 dB offset. In a particular embodiment, the offset control signal may be received from a host system (such as a computer, a processor, another integrated circuit, or any combination thereof), a control circuit, other circuitry, or any combination thereof.

The peak detector circuit 404 further includes a slicer 418 that is adapted to slice the adjusted peak output information to generate peak output data, which is provided to a first input of the first logical OR gate 408. The first logical OR gate 408 is adapted to apply a logical OR operation to the generated peak data output and a peak detector enable/disable signal, which may be received from a host system, a control circuit, other circuitry, or any combination thereof. In a particular example, when the peak detector enable/disable signal is at a logic low level, the output of the first logical OR gate 408 follows the generated peak output data. When the peak detector enable/disable signal is at a logic high level, the peak detector 404 is disabled, and the output of the logical OR gate 408 is a logic high signal.

The average detector 406 includes an averaging filter 420 to receive the source signal and to generate average output information related to the source signal. The average detector 406 further includes a slicer 422 that is adapted to slice the generated average output information to produce average output data, which is provided to a first input of the second logical OR gate 410. The second logical OR gate 410 further includes a second input to receive an average detector enable/disable signal from a host system, a control circuit, other circuitry, or any combination thereof. In a particular example, when the average detector enable disable signal represents a logical low level, the output of the logical OR gate 410 follows the average output data. When the average detector enable disable signal represent a logical high level, the output of the logical OR gate 410 is always high, and the average detector 406 is disabled.

The average output data and the peak output data are provided to the logical AND gate 412, which combines the average and peak output data from the logical OR gates 408 and 410 to generate output data related to the received source signal. When one of the logical OR gates 408 or 410 is disabled, output data from the other logical OR gate represents the output data.

In a particular embodiment, both the peak and average detectors 404 and 406 can operate in parallel to generate peak and average data concurrently that are related to a source signal. The average detector 406 provides relatively high sensitivity as compared to the peak detector 404. The peak detector 406 enhances the robustness of the performance of the system 400 for demodulating amplitude shift keying (ASK) encoded signals, on-off keying (OOK) encoded signal, other encoded signals, or any combination thereof. Further, by operating the peak and average detectors 404 and 406 in parallel, immunity to co-channel pulse interference and continuous wave interference is enhanced without sacrificing sensitivity of the system 400. In a particular embodiment, the average detector 406 is relatively insensitive to adjustable gain control gain-switching (such as discrete gain steps).

In a particular embodiment, a control circuit may apply an average disable signal to the second logical OR gate 410 to disable the average detector 406 for larger (e.g., higher amplitude) source signals. Further, the control circuit may apply a peak disable signal to the first logical OR gate 408 to disable the peak detector 404 when the source signal includes amplitude modulation (AM) flutter (such as when the source signal fluctuates rapidly), and when the source signal is not encoded using Manchester encoding (phase encoding).

Figure 5:
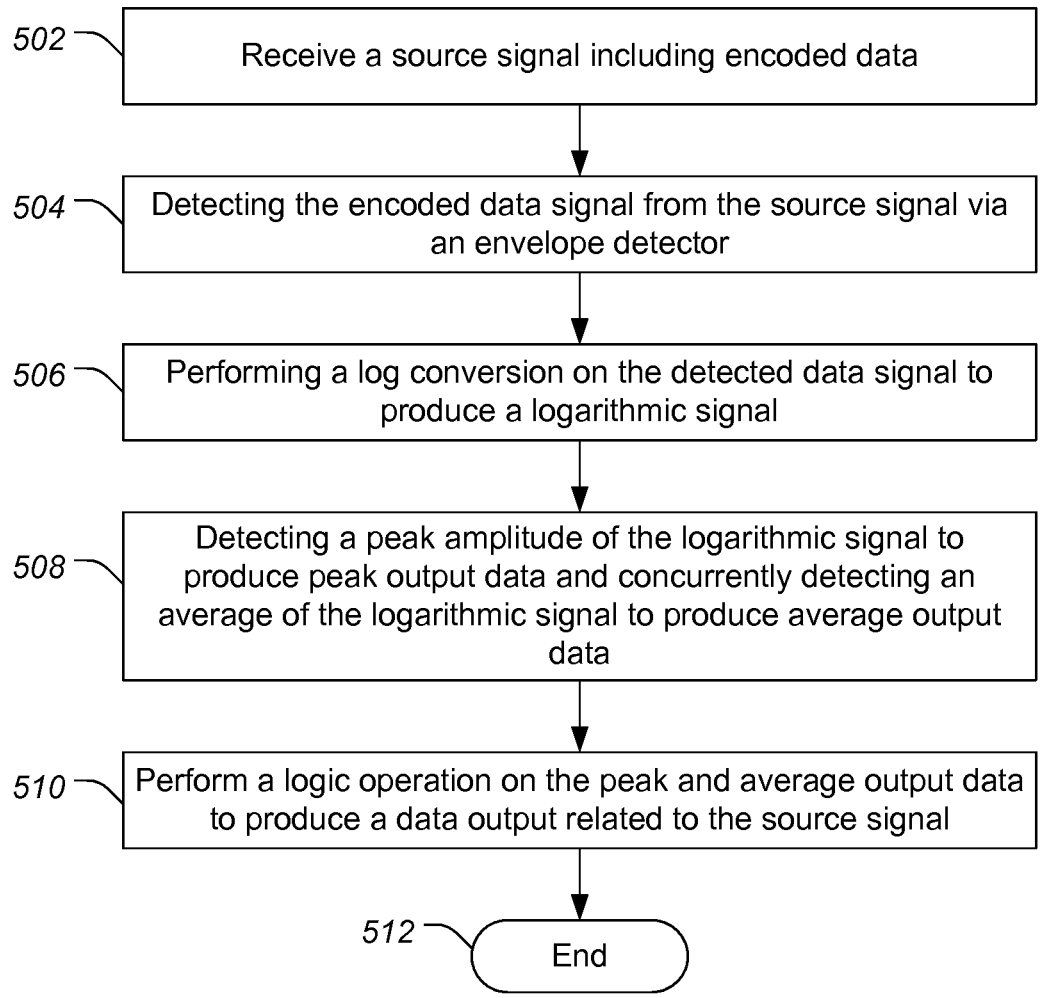
FIG. 5 is a flow diagram of a particular illustrative embodiment of a method of decoding a signal using a channel detector including an average detector and a peak detector in parallel.

FIG. 5 is a flow diagram of a particular illustrative embodiment of a method of decoding a signal using a channel detector including an average detector and a peak detector in parallel. At 502, a source signal is received that includes encoded data. In a particular embodiment, the source signal is encoded using on-off keying (OOK), amplitude shift-keying (ASK), another type of encoding, or any combination thereof. Advancing to 504, the encoded data signal is detected from the source signal using an envelope detector. Continuing to 506, a log conversion is performed on the detected data signal to produce a logarithmic signal. The log conversion is adapted to convert an input current (such as the envelope signal) to a logarithmic output voltage.

Proceeding to 508, a peak amplitude and an average amplitude of the logarithmic signal are detected concurrently to produce peak and average output data. Moving to 510, a logic operation is performed on the peak and average output data to produce a data output related to the source signal. In a particular embodiment, a logical AND gate receives the peak output data as a first input and the average output data as a second input to produce the output data. In another particular embodiment, the values provided to the inputs of the logical AND gate may be selectively activated via control logic, such that the peak amplitude detector and the average amplitude detector may be selectively deactivated. The method terminates at 512.

In conjunction with the systems and methods disclosed above with respect to FIGS. 1-5, a circuit device is disclosed that is adapted to decode an on-off keying (OOK) encoded signal. The circuit device includes a peak detector to generate peak amplitude data from a received signal and includes an average detector to generate average amplitude data from the received signal. The circuit device further includes logic to produce a data output related to peak and average amplitude data. In a particular embodiment, the peak and average amplitude data are combined via a logical AND operation to produce a data output related to the received signal.

Although the present invention has been described with reference to preferred embodiments, workers skilled in the art will recognize that changes may be made in form and detail without departing from the spirit and scope of the invention.

What is claimed is:
1. A circuit device comprising:
a peak detector to receive a signal and to generate a peak output related to the received signal, the peak detector including a level shifter configured to apply a signal offset to the peak output;
an average detector to generate an average output related to the received signal;
a logic circuit configured to perform a logical AND operation on at least one of the peak output and the average output to generate a data output related to the received signal; and
a first logical OR circuit to receive the peak output as a first input and to receive a peak enable signal as a second input, the first logical OR circuit to selectively provide the peak output to the logic circuit in response to receiving the peak enable signal; and
a second logical OR circuit to receive the average output as a third input and to receive an average enable signal as a fourth input, the second logical OR circuit to selectively provide the average output to the logic circuit in response to receiving the average enable signal.

2. The circuit device of claim 1, further comprising an envelope detector to receive the input signal and to produce an envelope output signal related to a peak amplitude of the high frequency input signal.

3. The circuit device of claim 2, further comprising a log conversion module coupled to the envelope detector, the log conversion module to convert the envelope output signal to a logarithmic signal, the log conversion module to provide the logarithmic signal to the peak and average detectors as the received signal.

4. The circuit device of claim 1, wherein the peak detector further comprises:
a slicer to slice the peak output relative to the received signal.

5. The circuit device of claim 1, wherein the received signal comprises an on-off keying encoded signal.

6. The circuit of claim 1, further comprising:
an AND gate including a first input to receive the output of the first logical OR circuit, a second input to receive the output of the second logical OR circuit, and an output to provide the data output.

7. The circuit of claim 6, further comprising a control circuit configured to provide the first control signal and the second control signal based on the received signal.

8. A circuit device comprising:
an input to receive a source signal;
an average detector coupled to the input and adapted to generate average data related to the source signal;
a peak detector coupled to the input and adapted to generate peak data related to the source signal;
a logic circuit to perform an AND operation on at least one of the average data and the peak data to generate an output signal at an output of the circuit, the logic circuit comprising:
a first OR gate including a first input coupled to the average detector to receive the generated average data and including a first control input responsive to the control circuit to receive an average enable signal, the first OR gate including a first output to selectively provide the generated average data in response to receiving the average enable signal;
a second OR gate including a second input coupled to the peak detector to receive the generated peak data and including a second control input responsive to the control circuit to receive a peak enable signal, the second OR gate including a second output to selectively provide the generated peak data in response to receiving the average enable signal; and
an AND gate including a first AND input coupled to the first output and including a second AND input coupled to the second output, the AND gate further including a data output, the AND gate to perform a logical AND operation on data received via the first and second AND gates to generate the output signal at the data output; and
a control circuit to selectively disable one of the average detector and the peak detector based on the source signal.

9. The circuit of claim 8, wherein the control circuit disables the peak detector via the peak enable signal when the source signal includes amplitude modulated flutter without Manchester encoding.

10. The circuit of claim 8, wherein the control circuit disables the average detector via the average enable signal when the source signal exceeds a threshold value.

11. The circuit of claim 8, wherein the source signal comprises a high frequency input signal.

12. The circuit of claim 11, wherein the average detector comprises:
an envelope detector coupled to the input to receive the high frequency input signal and to produce an output signal related to an envelope of the high frequency input signal; and
a log conversion module coupled to the envelope detector and adapted to convert the output signal to a logarithmic signal;
wherein the log conversion module provides the logarithmic signal to the peak and average detectors.

13. The circuit of claim 12, wherein the average detector further comprises:
an average filter to filter the logarithmic signal to produce an average signal; and
a slicer to sample the average signal to generate the average data.

14. The circuit of claim 12, wherein the peak detector further comprises:
a peak detection module to detect peak information related to the logarithmic signal;
a level shifter adapted to apply an offset to the peak information to produce adjusted peak information; and
a slicer to sample the adjusted peak information to generate the peak data.

15. A receiver circuit comprising:
an average detector to receive a source signal and to generate an average output related to the source signal; and
an average slicer coupled to the average detector to sample the average output to generate average output data;
a peak detector in parallel with the average detector and adapted to receive the source signal, the peak detector to generate a peak output related to the source signal, the peak detector includes a level shifter circuit to apply an offset to the peak output;
a peak slicer coupled to the peak detector to sample the peak output to generate peak output data; and
a logic circuit to receive the average output data and the peak output data, the logic circuit to perform a logical AND operation on at least one of the average output data and the peak output data to generate a decoded data output related to the source signal in response to receiving the average and peak output data, the logic circuit comprises:
a first OR gate to receive the average output data and a first control signal, the first OR gate including an output to provide a first output signal;
a second OR gate to receive the peak output data and a second control signal, the second OR gate including an output to provide a second output signal; and
an AND gate including a first AND input to receive the first output signal, a second AND input to receive the second output signal, and an AND output to provide the decoded data output.

16. The receiver circuit of claim 15, wherein the source signal is encoded via at least one of an on-off keying (OOK) encoding or an amplitude shift keying (ASK) encoding.

17. The receiver circuit of claim 15, further comprising:
an input responsive to a signal source to receive the source signal; and
an adjustable gain control circuit coupled to the input to adjust the source signal and to provide the adjusted source signal to the average and peak detectors.

18. The receiver circuit of claim 15, further comprising:
a control circuit to selectively provide the peak enable signal and the average enable signal based on the source signal, the control circuit to:

provide the first control signal to disable the first OR gate, causing the first OR gate to provide a logic high value as the first output signal, when the source signal exceeds a threshold value;

provide the second control signal to disable the second OR gate, causing the second OR gate to provide a logic high value as the second output signal, when the source signal includes amplitude modulated flutter without Manchester encoding; and otherwise the first OR gate provides the average output data as the first output signal and the second OR gate provides the peak output data as the second output signal.

* * * * *